United States Patent
Vinay et al.

(10) Patent No.: US 10,846,466 B2
(45) Date of Patent: Nov. 24, 2020

(54) DIGITAL DOCUMENT UPDATE USING STATIC AND TRANSIENT TAGS

(71) Applicant: Adobe Inc., San Jose, CA (US)

(72) Inventors: Vishwa Vinay, Bangalor (IN); Sopan Khosla, Kapurthala (IN); Sanket Vaibhav Mehta, Pune (IN); Sahith Thallapally, Karimnagar (IN); Gaurav Verma, Pathankot (IN)

(73) Assignee: Adobe Inc., San Jose, CA (US)

( * ) Notice: Subject to any disclaimer, the term of this patent is extended or adjusted under 35 U.S.C. 154(b) by 69 days.

(21) Appl. No.: 15/821,468

(22) Filed: Nov. 22, 2017

(65) Prior Publication Data

US 2019/0155880 A1 May 23, 2019

(51) Int. Cl.
| | |
|---|---|
| G06F 17/00 | (2019.01) |
| G06F 40/166 | (2020.01) |
| G06F 40/16 | (2020.01) |
| G06F 40/131 | (2020.01) |
| G06F 40/216 | (2020.01) |
| G06F 40/284 | (2020.01) |
| G06F 40/40 | (2020.01) |

(52) U.S. Cl.
CPC .......... *G06F 40/166* (2020.01); *G06F 40/131* (2020.01); *G06F 40/16* (2020.01); *G06F 40/216* (2020.01); *G06F 40/284* (2020.01); G06F 40/40 (2020.01)

(58) Field of Classification Search
CPC ....................................................... G06F 17/24
See application file for complete search history.

(56) References Cited

U.S. PATENT DOCUMENTS

| | | | |
|---|---|---|---|
| 6,002,867 A | 12/1999 | Jazdzewski | |
| 6,134,397 A | 10/2000 | Shimazaki et al. | |
| 8,346,620 B2 | 1/2013 | King et al. | |
| 10,489,498 B2 | 11/2019 | Vinay et al. | |
| 2002/0129053 A1 | 9/2002 | Chan et al. | |
| 2004/0210842 A1* | 10/2004 | Qamar ................. | G06F 17/2241 715/201 |
| 2006/0136352 A1* | 6/2006 | Brun ................... | G06F 17/2755 |
| 2007/0156745 A1* | 7/2007 | Harrington ......... | G06F 17/2229 |
| 2008/0052684 A1* | 2/2008 | Bowdidge ................ | G06F 8/72 717/136 |

(Continued)

OTHER PUBLICATIONS

"Create dynamic PDF documents in Adobe InDesign", Retrieved at: https://helpx.adobe.com/indesign/using/dynamic-pdf-documents.html—on Nov. 2, 2017, 10 pages.

(Continued)

*Primary Examiner* — Mustafa A Amin
(74) *Attorney, Agent, or Firm* — SBMC (57) ABSTRACT

Techniques and systems are described in which a document management system is configured to update content of digital documents through use of static and transient tags. A transient tag, for instance, may be associated with portions of the digital document that may be changed and a static tag with portions of the digital document that are not to be changed. An update to the digital document is then triggered by a document management system based on a triggering change made to an initial document portion of the digital document having a transient tag, and is not based on changes made to portions having a static tag or are untagged.

20 Claims, 7 Drawing Sheets

(56) References Cited

U.S. PATENT DOCUMENTS

| | | | |
|---|---|---|---|
| 2009/0076792 A1 | 3/2009 | Lawson-Tancred | |
| 2010/0063799 A1 | 3/2010 | Jamieson et al. | |
| 2011/0078165 A1* | 3/2011 | Battle | G06F 17/2229 707/756 |
| 2012/0151312 A1* | 6/2012 | Clee | G06F 17/2235 715/205 |
| 2013/0326349 A1* | 12/2013 | Mehalingam | G06F 17/24 715/271 |
| 2014/0164315 A1* | 6/2014 | Golshan | H04L 65/403 707/608 |
| 2014/0279729 A1 | 9/2014 | Delaney et al. | |
| 2014/0351788 A1* | 11/2014 | Bienkowski | G06F 8/34 717/110 |
| 2016/0098574 A1* | 4/2016 | Bargagni | G06F 21/6218 707/786 |
| 2019/0251150 A1 | 8/2019 | Vinay et al. | |
| 2020/0081964 A1 | 3/2020 | Maneriker et al. | |

OTHER PUBLICATIONS

"Creating and Managing Content Fragments", Retrieved at: https://helpx.adobe.com/experience-manager/6-2/assets/using/content-fragments.html—on Nov. 2, 2017, 19 pages.

"Personalizing content", Retrieved at: https://webhelp.episerver.com/15-2/EN/Content/EN/CMS%20Edit/Edit_Personalization.htm—on Apr. 17, 2018, 2 pages.

"Sitecore Documentation: Edit the website content", Retrieved at: https://doc.sitecore.net/sitecore_experience_platform/content_authoring/creating_and_editing_items/editing/edit_the_website_content—on Apr. 17, 2018, 5 pages.

"Web Content Management | Acquia", Retrieved at: https://www.acquia.com/solutions/web-content-management—on Apr. 17, 2018, 6 pages.

"Wysiwyg | Drupal.org", Retrieved at: https://www.drupal.org/project/wysiwyg—on Apr. 17, 2018, 2 pages.

Bock,"Smart Content in the Enterprise—How Next Generation XML Applications Deliver New Value to Multiple Stakeholders", Aug. 2010, 87 pages.

Gehrmann,"Deploying AI Methods to Support Collaborative Writing: a Preliminary Investigation", May 21, 2015, 8 pages.

Georgescu,"Extracting Event-Related Information from Article Updates in Wikipedia", ECIR 2013, Mar. 24, 2013, 12 pages.

Kenter,"Siamese CBOW: Optimizing Word Embeddings for Sentence Representations", Proceedings of the 54th Annual Meeting of the Association for Computational Linguistics, 2016, Aug. 7, 2016, pp. 941-951.

Levy,"Dependency-Based Word Embeddings", Proceedings of the 52nd Annual Meeting of the Association for Computational Linguistics (Short Papers), 2014, Apr. 25, 2014, pp. 302-308.

Liu,"A Sentence Interaction Network for Modeling Dependence between Sentences", Proceedings of the 54th Annual Meeting of the Association for Computational Linguistics, Aug. 7, 2016, pp. 558-567.

MacComascaigh,"Magic Quadrant for Web Content Management", Sep. 28, 2016, 32 pages.

Mikolov, "Efficient estimation of word representations in vector space", arXiv preprint arXiv:1301.3781 (2013), Sep. 7, 2013, 12 pages.

Neuwirth,"Flexible Diff-ing in a Collaborative Writing System", Nov. 1992, 8 pages.

Palangi,"Deep Sentence Embedding Using Long Short-Term Memory Networks: Analysis and Application to Information Retrieval", EEE/ACM Transactions on Audio, Speech, and Language Processing, Jan. 16, 2016, 25 pages.

Schuhmacher,"Knowledge-based Graph Document Modeling", WSDM '14 Proceedings of the 7th ACM international conference on Web search and data mining, Feb. 28, 2014, 10 pages.

Tai,"Improved Semantic Representations From Tree-Structured Long Short-Term Memory Networks", ACL 2015, Jul. 26, 2015, pp. 1556-1566.

Tschuggnall,"Overview of the Author Identification Task at PAN-2017: Style Breach Detection and Author Clustering", Dec. 2017, 22 pages.

Yu,"Deep Learning for Answer Sentence Selection", CoRR 2014, Dec. 4, 2014, 9 pages.

Zhong,"Aligning Knowledge and Text Embeddings by Entity Descriptions", EMNLP 2015, Sep. 17, 2015, pp. 267-272.

Zhu,"CEPT: Collaborative Editing Tool for Non-Native Authors", Feb. 25, 2017, 13 pages.

Abustan,"Gibane Group Research Report: Smart Content in the Enterprise", Sep. 7, 2010, 2 pages.

Chu,"KATARA: A Data Cleaning System Powered by Knowledge Bases and Crowdsourcing", Proceedings of the 2015 ACM SIGMOD International Conference on Management of Data, May 27, 2015, 15 pages.

Hoffart,"YAGO2: A spatially and temporally enhanced knowledge base from Wikipedia", Artificial Intelligence vol. 194, Jan. 2013, 28 pages.

Kasneci,"NAGA: Harvesting, Searching and Ranking Knowledge", SIGMOD Conference2008, Jun. 12, 2008, 3 pages.

"Supplemental Notice of Allowance", U.S. Appl. No. 15/897,059, dated Sep. 11, 2019, 2 pages.

"Notice of Allowance", U.S. Appl. No. 15/897,059, dated Jul. 9, 2019, 9 pages.

"Supplemental Notice of Allowability", U.S. Appl. No. 15/897,059, dated Oct. 22, 2019, 2 pages.

"Pre-Interview First Office Action", U.S. Appl. No. 16/123,966, dated Apr. 17, 2020, 3 pages.

"First Action Interview Office Action", U.S. Appl. No. 16/123,966, dated May 4, 2020, 3 pages.

\* cited by examiner

About Creative ~~Suite~~ Cloud extensions

The section provides an overview of the Creative Suite extensibility technology, which provides a common infrastructure for development and deployment of extensions that work across a set of supported Creative Suite Applications. An Creative Suite extension is a set of files that together extend the capabilities of one or more Creative Suite applications. Developers can user extensions to add services and to integrate new features across the applications in the Suite.

Author: John Smith
Title: Vice President

504

About Creative Cloud extensions

The section provides an overview of the Creative ~~Suite~~ Cloud extensibility technology, which provides a common infrastructure for development and deployment of extensions that work across a set of supported Creative ~~Suite~~ Cloud Applications. An Creative ~~Suite~~ Cloud extension is a set of files that together extend the capabilities of one or more Creative ~~Suite~~ Cloud applications. Developers can user extensions to add services and to integrate new features across the applications in the ~~Suite~~ Cloud .

Author: John Smith
Title: Vice President

602
Receive a digital document having a plurality of document portions, an initial document portion of the plurality of document portions associated with a transient tag

604
Detect an input specifying a triggering change to the initial document portion associated with the transient tag

606
Apply the triggering change to the initial document portion

608
Detect, automatically and without user intervention using natural language processing, a subsequent document portion to apply a trailing change based on the triggering change

610
Apply the trailing change to the subsequent document portion automatically and without user intervention using natural language processing

612
Output the changed portions

DIGITAL DOCUMENT UPDATE USING STATIC AND TRANSIENT TAGS

BACKGROUND

Digital documents are an integral part of the digital content revolution to retain information, both personal and in the enterprise. Digital documents, for instance, may be configured in a variety of ways to represent a diverse range of information, such as through a word processing document to record text, spreadsheets to record numbers and numerical relationships, presentations that serve as a basis for lectures and notes, digital images of artworks, and so forth.

Creation and use of digital documents typically follows a lifecycle of planning, creation, publishing, and managing of the digital documents. Conventional techniques and systems focus on planning, creation, and publishing of the digital documents. Thus, these conventional techniques focus on how to create the digital documents as well as how to make these digital documents available to others. However, conventional techniques and systems do not address the maintenance of the digital documents.

As described above, digital documents are one of the primary techniques used to retain information. This information, however, may become stale and outdated over time and therefore cause the digital document to lack relevancy. This may become especially problematic for digital documents that are made available via a network (e.g., a weblog via the Internet) because these documents may remain available even when the information contained within the documents is no longer valid. Thus, failure of conventional digital document techniques to address maintenance of digital documents limit applicability and accuracy of these documents, especially within a digital medium environment such as the Internet.

SUMMARY

Techniques and systems are described in which a document management system is configured to update content of digital documents through use of static and transient tags. The static and transient tags enable a content creator to have a degree of control in how a digital document is updated in the future. Further, the static and transient tags may improve operation of a computing device by defining which document portions trigger an update to the digital document and which document portions do not. Hereinafter, document portions are also referred to as "portions." A transient tag, for instance, may be associated with portions of the digital document that may be changed and a static tag with portions of the digital document that are not to be changed.

An update to the digital document is then triggered by a document management system based on a triggering change applied to a portion of the digital document having a transient tag, and is not based on changes made to portions having a static tag or are untagged. The triggering change may be based on receipt of a manual user input by the document management system or based on a change to a document repository that is detected by the document management system using natural language processing as part of machine learning. In an implementation, trailing changes are then applied by the document management system to portions of the digital document that have a transient tag or are untagged, but is not performed for portions having a static tag. This may be performed to maintain factual accuracy, logical consistency, linguistic correctness, and stylistic continuity. This may also be performed iteratively such that a trailing change to a portion of the digital document may cause a triggering change to other portions of the digital document.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Conventional digital document techniques and systems focus on the creation and publication of digital documents, and do not address how to maintain information of the digital documents over time. Consequently, conventional techniques and system may limit applicability and accuracy of these digital documents.

Accordingly, techniques and systems are described in which a document management system is configured to update content of digital documents through use of static and transient tags. The document management system, for instance, employs static and transient tags to control how a digital document is updated in the future. As a result, the document management system supports a dynamic digital document that is capable of addressing content changes through updates over time while still providing a content creator a degree of control over desired portions of the digital document.

For example, the document management system may receive inputs from a content creator to associate a transient tag with portions of the digital document that may be changed and a static tag with portions of the digital document that are not to be changed. A document update module of a document management system may then use these tags to control update of the digital document. In an implementation, a default may be used by the document management system in which each part of a digital document is labeled with a transient tag unless otherwise specified otherwise by a user.

A document update module of the document management system then determines whether a triggering change has been made to portions of the digital document that includes transient tags but not portions of the digital document having static tags or that are untagged. In this way, a determination is made by the document update module with increased computational efficiency by basing this update on changes made to portions of the digital document that have been tagged as transient and not portions of the digital document that have static tags or are untagged. The change to the portions having transient tags may be detected by the document update module in a variety of ways, such as through a manual user input or automatically and without user intervention by detecting a change in a document repository that involves content in the portion, e.g., through natural language processing using machine learning.

Once the triggering change is applied to the digital document by the document update module, the document update module then determines whether a trailing change is to be made to that portion of other portions of the digital document based on the triggering change. The trailing change, for instance, is a change made to another portion in the digital document or another digital document through natural language processing as part of machine learning such that the other portion is semantically (e.g., meaning in language or logic) and syntactically (e.g., arrangement of words and phrases) consistent with the triggering change. In an implementation, this determination is made for portions of the digital document having transient tags or are untagged but are not made for portions of the digital document having static tags. Among other benefits, the determination and application of changes based on the tag increases computational efficiency in execution of the document update module. This also provides a content creator a capability to control updates to the digital document by specifying which portions may be updated and which portions are not to be updated by the document update module.

The document update module, for instance, may perform natural language processing using machine learning to determine applicability of the triggering change to the other portions. This may be performed to maintain factual accuracy, logical consistency, linguistic correctness, and stylistic continuity. This may also be performed iteratively such that a trailing change to a portion of the digital document may cause a triggering change to other portions of the digital document. As a result, the digital document in this example is updated, rather than replaced, although versions of the digital document may be maintained as desired.

This is not possible using conventional techniques, including conventional artificial intelligence techniques that generate a unique instance of a digital document to describe content as a whole. For example, artificial intelligence may be used to generate a summary of a subject, e.g., from a data repository. Conventional techniques to do so generated this summary "from scratch" each time, and therefore each summary is considered a snapshot of the information at a corresponding point in time. Therefore, these summaries are not updated, but rather a unique instance is created each time and thus suffered from the challenges of other conventional techniques that generated a new version of a digital document when an older version became outdated. Further discussion of digital document update techniques using static and transient tags is described in the following sections and shown in corresponding figures.

In the following discussion, an example environment is first described that may employ the techniques described herein. Example procedures are also described which may be performed in the example environment as well as other environments. Consequently, performance of the example procedures is not limited to the example environments and the example environment is not limited to performance of the example procedures.

Example Environment

Figure 1:
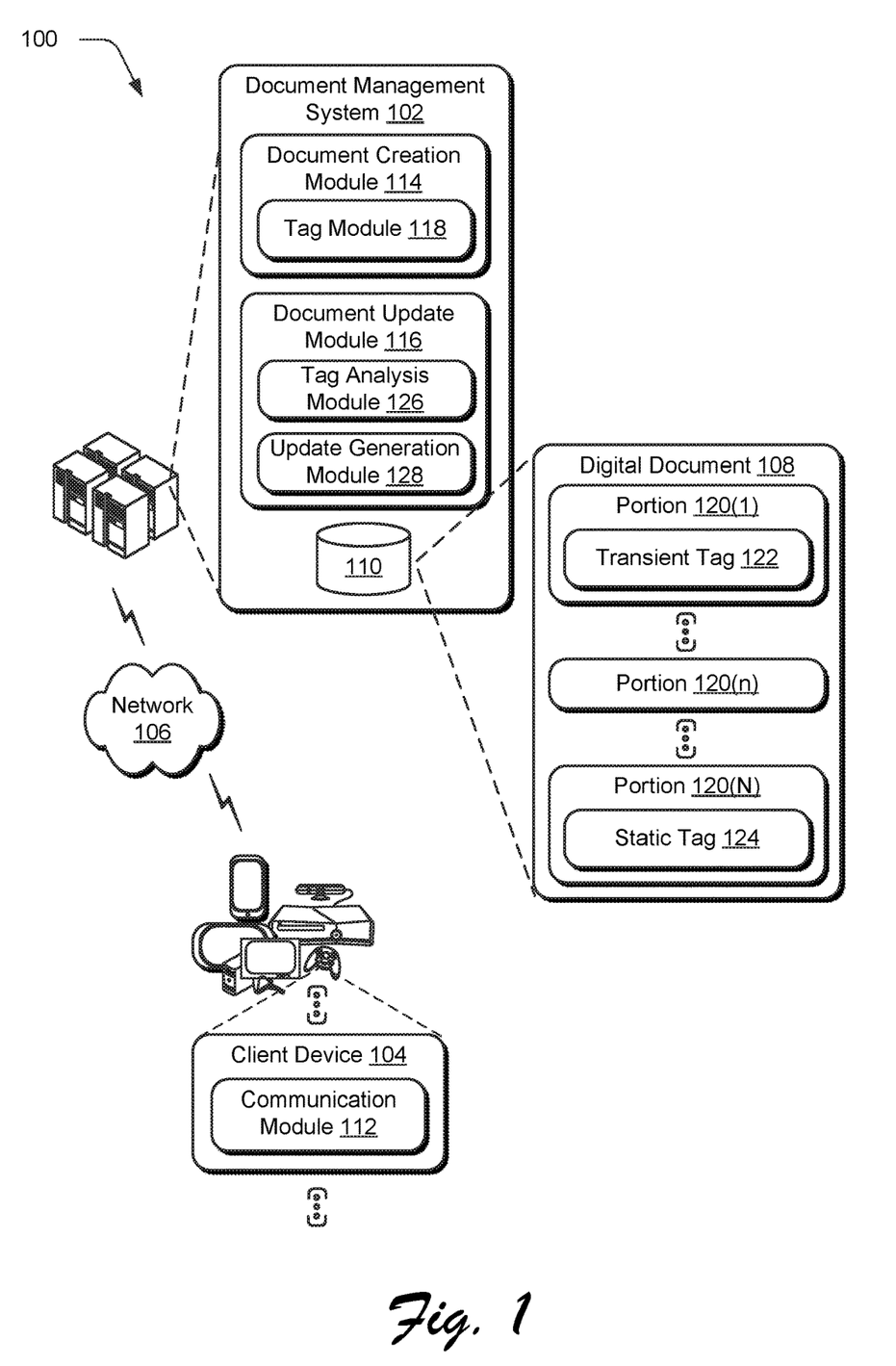
FIG. 1 is an illustration of an environment in an example implementation that is operable to employ digital document update techniques involving static and transient tags described herein.

FIG. 1 is an illustration of a digital medium environment 100 in an example implementation that is operable to employ digital document update techniques described herein. The illustrated environment 100 includes a document management system 102 and client device 104 of a plurality of client devices that are communicatively coupled, one to another, via a network 106. The document management system 102 and client device 104 are implemented via a computing device, which may be configured in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is discussed, a computing device may be representative of a plurality of different devices, such as multiple servers utilized by a business to perform operations "over the cloud" as illustrated for the document management system as described in relation to FIG. 7.

The document management system 102 is configured to manage creation, publication, and maintenance of a digital document 108, which is illustrated as stored in a storage device 110. The digital document 108 may be configured in a variety of ways. Examples of digital document 108 configurations include a word processing document to record text, spreadsheets to record numbers and numerical relationships, presentations that serve as a basis for lectures and notes, digital images of artworks, webpages, blogs, and so forth. Functionality may be implemented locally by the document management system 102 and/or remotely, e.g., through access by a communication module 112 such as a mobile application or browser of the client device 104 via the network 106.

To do so, the document management system 102 includes a document creation module 114 and a document update module 116. The document creation module 114 includes functionality to create the digital document 108. This functionality may include a user interface to enter text, configure a layout, create images, slides, audio, sheets, and so forth. The document update module 116 is configured to update the digital document 108, such as to address changes in information described by content of the digital document 108 over time.

The document creation module 114 includes a tag module 118 to associate tags with document portions (also referred to as "portions in the following discussion) of the digital document 108 usable to control a subsequent update to the digital document 108. The document creation module 114, for instance, may receive user inputs to create a plurality of portions 120(1), 120(n), . . . , 120(N), e.g., text, images, graphs, illustrations, and so forth. The tag module 118 is then configured to also receive user inputs to specify which portions 120(1)-120(N) are permitted to be updated and which portions are not. This is done in this example through use of a transient tag 112 for portion 120(1), lack of a tag for portion 120(n), and a static tag 124 for portion 120(N). In this way, a creator of the digital document 108 is given control as to how content of the digital document 108 is updated.

The document update module 116, for instance, includes a tag analysis module 126 and an update generation module 128. The tag analysis module 126 is configured to identify which portions of the digital document 108 include transient tags, static tags, or are untagged. The transient tags 122 are used by the update generation module 128 to determine whether to update the digital document 108. The update generation module 128, for instance, may base this determination on whether content in the portion 120(1) having the transient tag 122 is to be changed, and is not based on changes to the untagged portion 120(n) or the portion 120(N) having a static tag 124. This is referred to as a triggering change in the following discussion. In this way, the update generation module 128 may make this determination with increased computational efficiency by determining whether to perform the update based on specified portions of the document, solely, that have the transient tags.

Once the triggering change is applied, the update generation module 128 then determines whether additional changes are to be made to that portion or other portions of the digital document 108, which are referred to as trailing changes. To do so, the update generation module 128 determines which portions of the digital document 108 also include transient tags or are untagged. The update generation module 128 then performs natural language processing using machine learning to detect which triggering changes are to be made, if any, to the portions. This may be performed in order to maintain factual accuracy, logical consistency, linguistic correctness, and stylistic continuity. The update generation module 128 may make this determination iteratively such that a triggering change may affect other triggering changes to other portions of the digital document 108. In this way, the tags provide a degree of control regarding how updates are applied to the digital document 108 with increased computational efficiency. In the following description, creation of a digital document 108 including tagging of portions is first described. Then update of the digital document 108 is described that employs the tags included in the created document 108.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Document Creation and Tag Association

Figure 2:
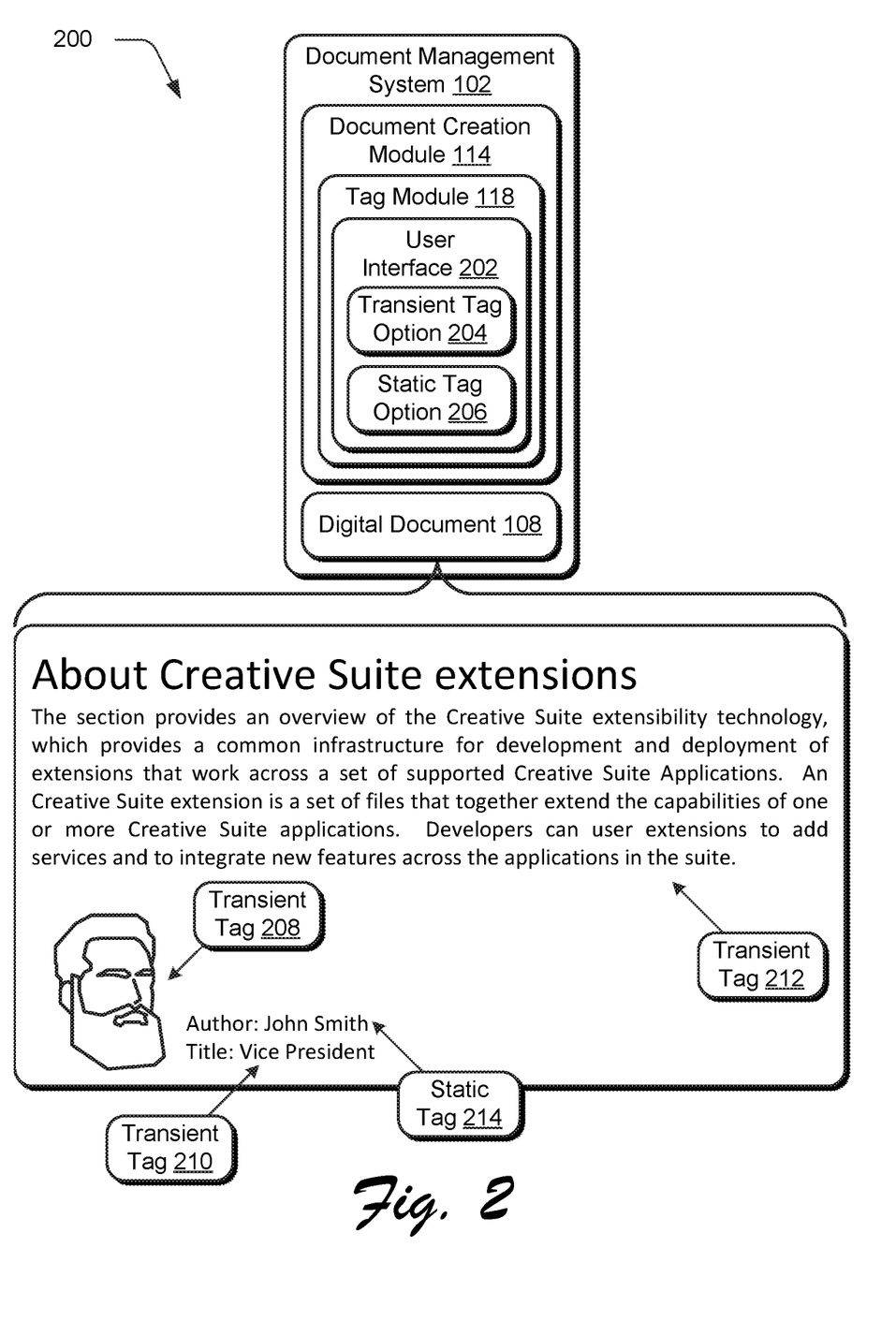
FIG. 2 depicts a system in an example implementation in which a digital document is created and static and transient tags are associated with corresponding portions of the digital document to control update of the document.
Figure 3:
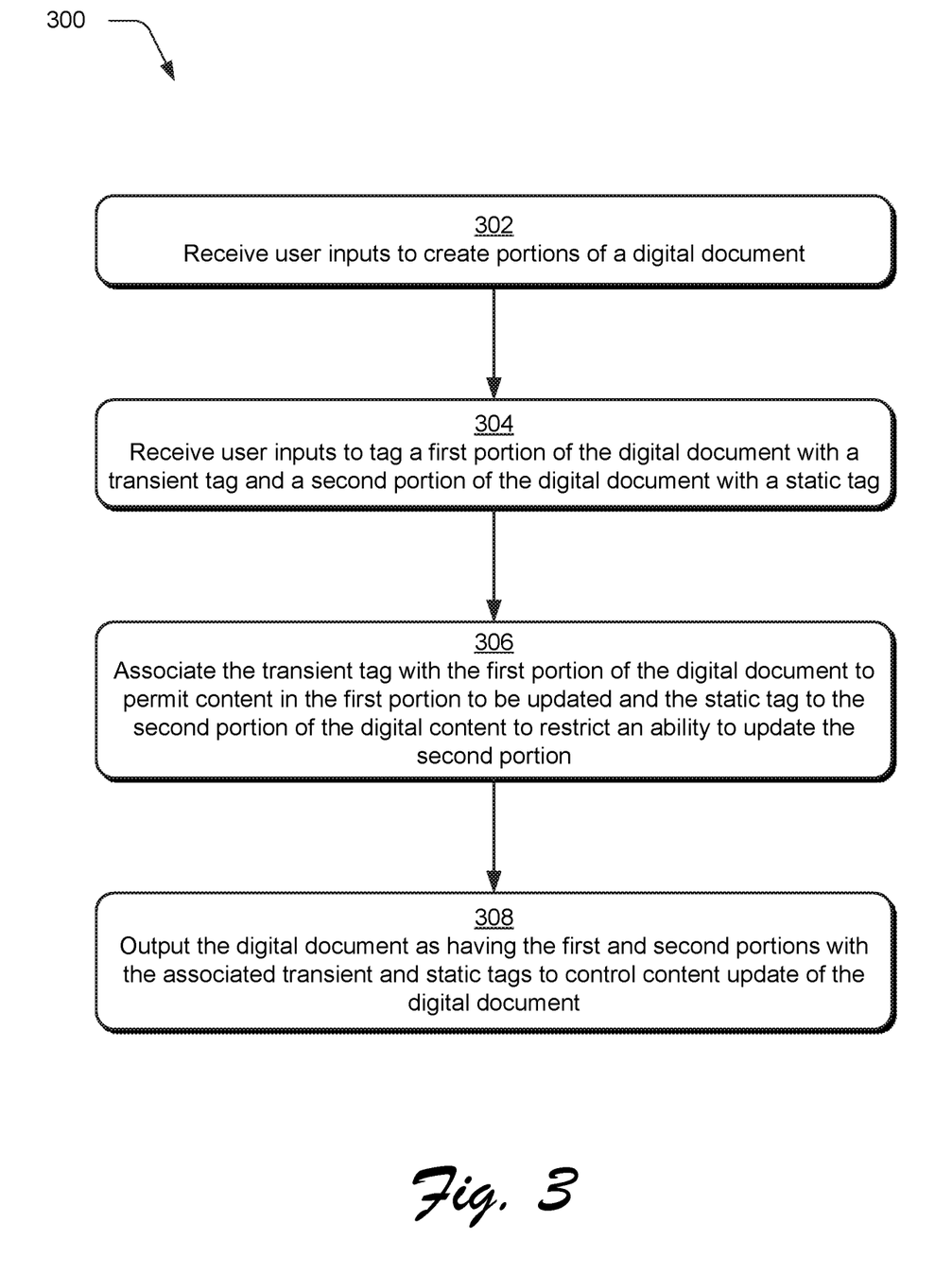
FIG. 3 is a flow diagram depicting a procedure in an example implementation of digital document creation and tag association.

FIG. 2 depicts a system 200 in an example implementation in which a digital document is created and static and transient tags are associated with corresponding portions of the digital document 108 to control update of the document. FIG. 3 depicts a procedure 300 in an example implementation of digital document creation and tag association.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-3.

The document creation module 118 is configured to output a user interface 202. The user interface 202 is configured to receive user inputs to create portions of a digital document 108 (block 302). In the illustrated example, this includes text and a digital image, such as through interaction with a word processing application.

User inputs are also received to tag a first portion of the digital document 108 with a transient tag and a second portion of the digital document 108 with a static tag (block 304). The user interface 202, for instance, may include a transient tag option 204 and a static tag option 206 to associate transient tags and static tags with respective portions of the digital document 108 as part of the digital document's 108 metadata. This may be performed by highlighting respective portions, through use of gestures (e.g., to circle respective portions), spoken utterances, through use of a pop-up menu, and so forth.

In response, transient tags are associated by the document creation module 118 with respective portions of the digital document to permit content in the first portion to be updated. In the illustrated instance, transient tags 208, 210, 212 are associated with a digital image of the author, job title, and body of the text, respectively. Static tags are associated with the second portion of the digital content to restrict an ability to update the second portion (block 306), an example of which a static tag 214 associated with a name of the author of the digital document 108.

The tags, for instance, may be associated by the document creation module 118 as part of metadata, through use of tags of a markup language (e.g., XML, HTML), and so forth. The digital document is then output by the document creation module 118 as having the first and second portions and associated static and transient tags to control content update of the digital document 106 (block 308). Thus, a creator of the digital document 108 is provided an ability through interaction with by the document creation module 118 to specify which portions of the digital document 108 may and may not be updated as further described in the following section.

Digital Document Update Control Based on Associated Tags

Figure 4:
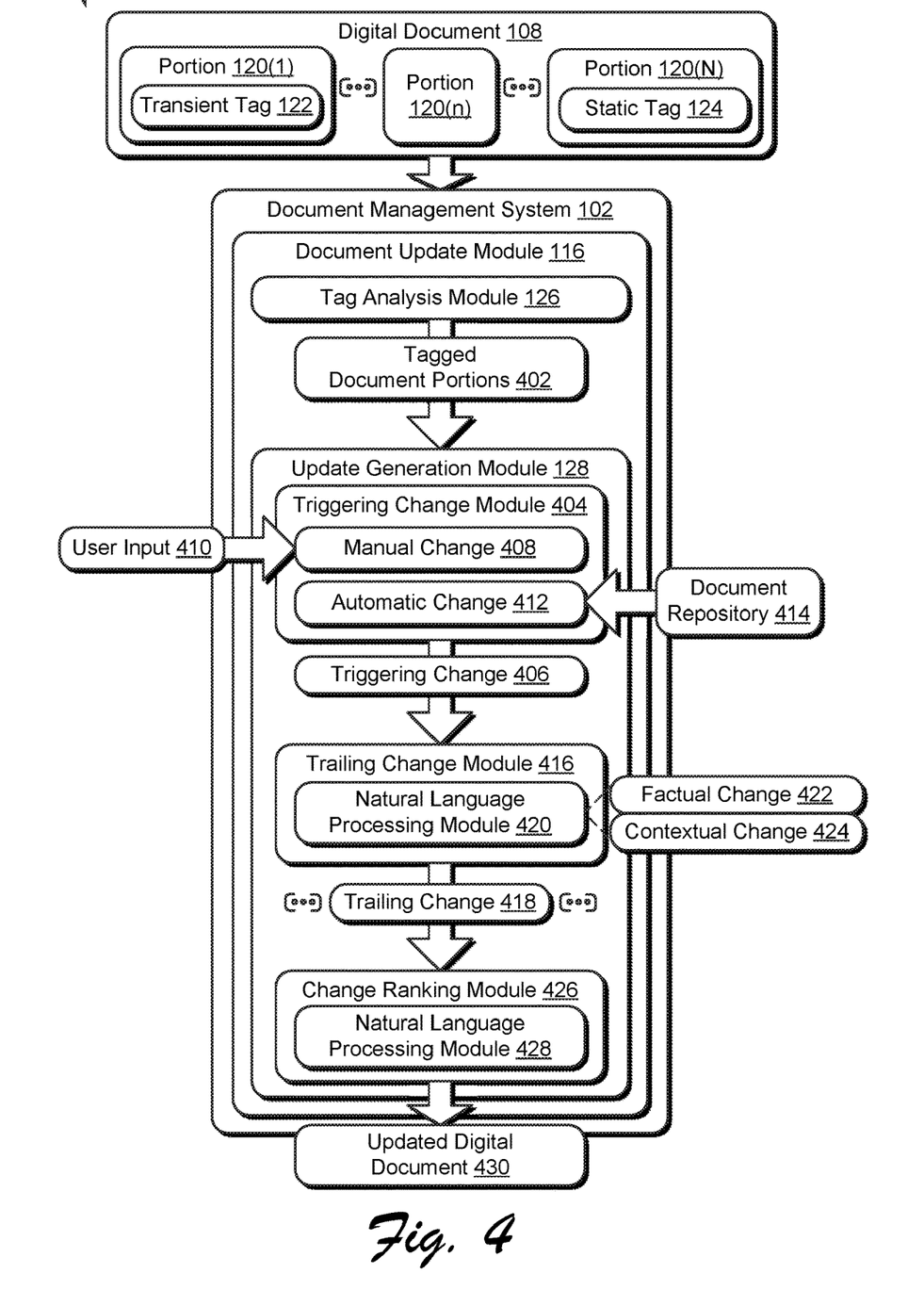
FIG. 4 depicts a system in an example implementation in which a digital document having associated tags is updated using triggering and trailing changes.
Figure 5:
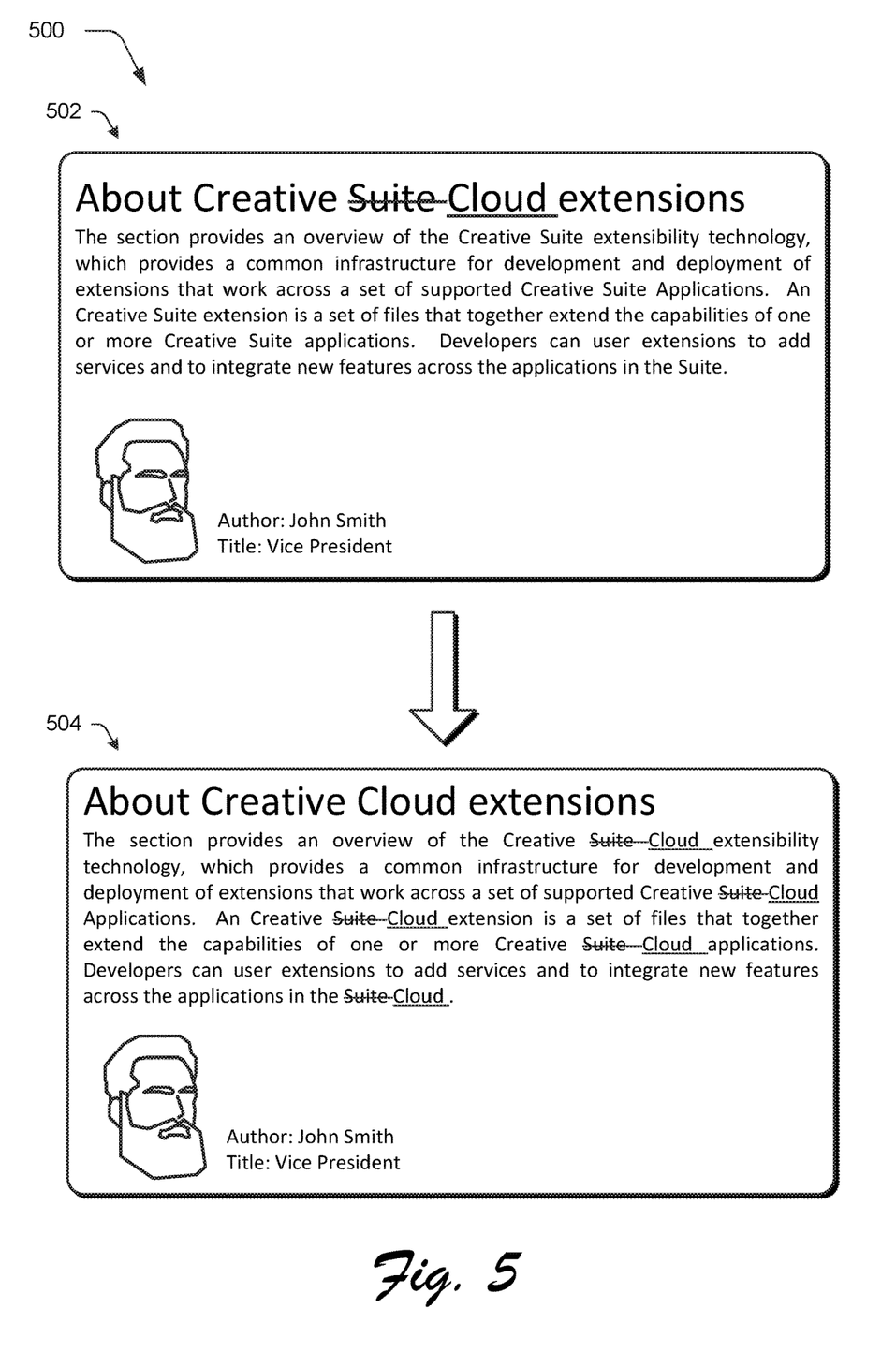
FIG. 5 depicts an example implementation of triggering and trailing changes.
Figure 6:
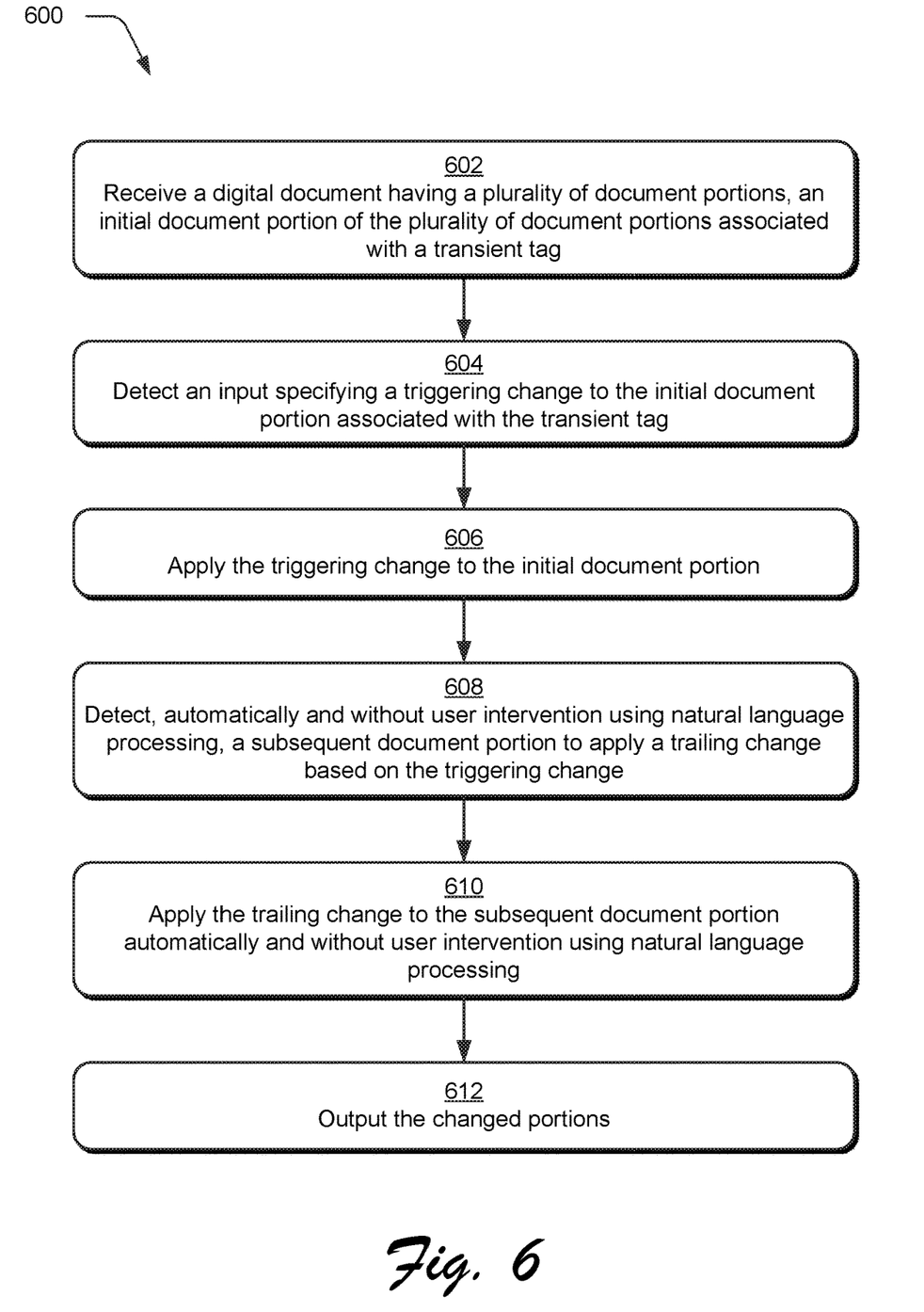
FIG. 6 is a flow diagram depicting a procedure in an example implementation of update of the digital document of FIGS. 2 and 3 using transient and static tags to perform triggering and trailing changes to respective portions of the document.

FIG. 4 depicts a system 400 in an example implementation in which a digital document having associated tags is updated using triggering and trailing changes. FIG. 5 depicts an example implementation 500 of triggering and trailing changes. FIG. 6 depicts a procedure 600 in an example implementation of digital document update using transient and static tags to perform triggering and trailing changes to respective portions of the digital document.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 4-6.

In this example, the document update module 116 receives the digital document 108, e.g., from the storage device 110, that includes a plurality of document portions 120(1)-120(N). A determination is made by the tag analysis module 126 as to which of a plurality of portions 120(1)-120(N) of the digital document 108 are tagged using a transient tag, static tag, or are untagged (block 602), e.g., to generate data describing the tagged document portions 402.

A determination is then made as whether to update the digital document 108. This determination is made by detects an input specifying a triggering change 406 to an initial portion associated with a transient tag (block 604), e.g., portion 120(1) and transient tag 122. A triggering change module 404, for instance, is configured to detect the triggering change on portions 120(1) having the transient tag 122 but not portions 120(n) that are untagged or a portion 120(N) having a static tag 124. This results in increased computational efficiency in that a lesser number of portions of the digital document 108 are processed to as part of this detection. Further, this provides a degree of control over the update to a content creator to define when to update the digital document 108 through use of the tags, e.g., such that the update is triggered based on a change to portion 120(1) but not a change to the untagged portion 120(n) or the portion 120(N) having the static tag 124.

A triggering change may be detected by the trigger change module 404 in a variety of ways. A manual change 408, for instance, may be detected based on a user input 410 to the portion 120(1) having the transient tag 122. As shown at a first stage 502 of an example implementation 500 of FIG. 5, for instance, a user input 410 is received to a title portion to change from "creative suite" to "creative cloud." This manual change 408 is then detected by the triggering change module 404 as involving a change to a portion 120(1) having a transient tag 122. The triggering change 406 is then applied to the initial portion of the digital document 108 (block 606).

In another example, the triggering change module 404 is configured to detect the triggering change 406 as an automatic change 412 automatically and without user intervention by the triggering change module 404. The triggering change module 404, for instance, may be configured to perform natural language processing using machine learning. One example of natural language processing is natural language understanding (NLU), which is tasked with understanding "what" is included within the natural language.

To do so, natural language understanding as implemented by the triggering change module 404 includes functionality to address diverse syntax through use of a lexicon, a parser, and grammar rules to break a series of text (e.g., portion 120(1) of the digital document 108) into an internal representation using machine learning. This internal representation may then be compared with similarly generated internal representations of content from a document repository 414 to determine if the portion 120(1) is to be changed. The document repository 414, for instance, may be associated with an enterprise, a collection of a user's personal digital documents 108, and so forth. Through natural language processing and understanding techniques, the triggering change module 404 may determine which changes to the document repository 414, if any, are relevant to the portions 120(1) of the digital document 108 having the transient tag 122, e.g., through comparison of the internal representations. The triggering change 406 is then made to the digital document 108 automatically and without user intervention by the triggering change module 404 in this example.

Regardless of how the triggering change 406 is applied, a trailing change module 416 is then employed to detect a subsequent portion to be changed using a trailing change 418, automatically and without user intervention, based on the triggering change using natural language processing. The subsequent portion may be included as part of the digital document itself or another digital document (block 608), e.g., included in a document repository. The trailing change is then applied to the subsequent portion automatically and without user intervention (block 610).

The trailing change module 416, for instance, may also include a natural language processing module 420 to determine whether portions of the digital document 108 that are tagged using a transient tag 122 or that are untagged are to be changed based on the triggering change 406, e.g., portions 120(1) and 120(n). In an implementation, this is not performed for the portion 120(N) having a static tag 124 and thus conserves computational resources as previously described.

The trailing change module 416 is configured to ensure that the portions of the digital document 108 are consistent with the triggering change. To do so, the natural language processing module 420 identifies factual changes 422 and contextual changes 424 to be made based on the triggering change 406. A factual change 422, for instance, may involve a name change of a product line, such as from "Creative Suite" to "Creative Cloud" in the example of FIG. 5. Thus, a triggering change made in the first stage 502 causes subsequent trailing changes to be made to the digital document as shown at the second stage 504.

A contextual change 424 may include a change to a fact as well as a context of that change to surrounding text. For example, Pluto has been changed from being listed at the ninth planet in our solar system to a minor planet. Thus, a trailing change 418 involving Pluto in text "Pluto is currently the ninth and last planet from the Sun" involves both a change in facts as well as context in the sentence, such as to "Pluto is a minor planet in the Kuiper belt of our solar system." This is performed by the natural language processing module 420 through natural language understanding by the trailing change module 416.

In the illustrated example system 400 of FIG. 4, the trailing change module 416 is configured to apply the trailing changes iteratively such that one trailing change may cause another trailing change. These are then output to a change ranking module 426 that is also configured to employ a natural language processing module 328 to rank the changes. The ranking, for instance, may be based on scores generated by the natural language processing module 428 for factual accuracy, logical consistency, linguistic correct, and stylistic continuity as part of machine learning. The ranking may then be employed in a variety of ways, such as to automatically apply the highest ranked change, output in a user interface for user selection, and so forth. The changed portions (block 612) are then output, e.g., for display, stored in a storage device 110, and so forth. The changed portions, for instance, may be included in the same digital document and/or different digital documents.

Example System and Device

Figure 7:
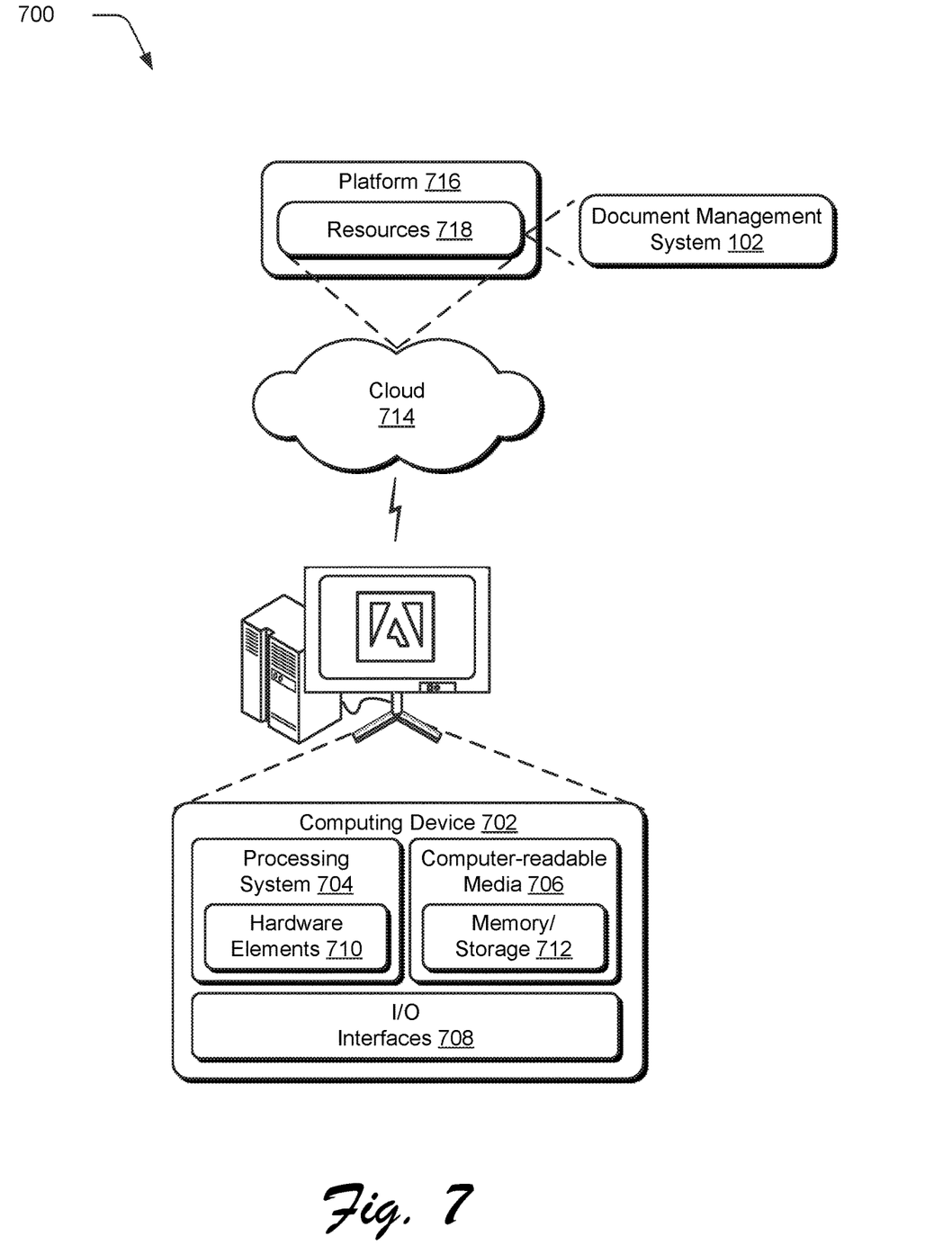
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the document management system 102. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium document update environment, a method implemented by at least one computing device, the method comprising:
    detecting, by the at least one computing device, an input specifying a triggering change to an initial document portion of a digital document;
    applying, by the at least one computing device, the triggering change to the initial document portion of the digital document;
    detecting, by the at least one computing device, that a subsequent document portion includes a transient tag or that the subsequent document portion is untagged, the detecting based on metadata associated with the subsequent document portion;
    determining, by the at least one computing device responsive to the detecting that the subsequent document portion includes the transient tag or is untagged, that a trailing change is to be applied to the subsequent document portion, the determining performed automatically and without user intervention based on natural language processing of the subsequent document portion and the triggering change; and
    applying, by the at least one computing device, the trailing change to the subsequent document portion automatically and without user intervention responsive to the determining.

2. The method as described in claim 1, further comprising determining, by the at least one computing device, which of a plurality of document portions of the digital document are tagged using the transient tag, a static tag, or are untagged.

3. The method as described in claim 2, wherein the initial document portion includes the transient tag.

4. The method as described in claim 2, wherein the determining is not performed for a document portion of a plurality of document portions having the static tag.

5. The method as described in claim 1, wherein the applying of the trailing change is performed for a plurality of said subsequent document portions and further comprising outputting the plurality of said subsequent document portions in a ranked order.

6. The method as described in claim 5, wherein the ranked order is based on whether the trailing changes involve factual accuracy, logical consistency, linguistic correctness, or stylistic continuity.

7. The method as described in claim 1, wherein the triggering change involves receipt of a user input to manually specify the triggering change to the initial document portion.

8. The method as described in claim 1, wherein the triggering change includes detecting a change, automatically and without user intervention, to a document repository outside of the digital document, the document repository identified as having subject matter that corresponds to subject matter of the initial document portion of the digital document.

9. The method as described in claim 1, wherein the subsequent document portion is included in another digital document.

10. In a digital medium document update environment, a system comprising:
    a triggering change module implemented at least partially in hardware of a computing device to:
        detect an input specifying a triggering change to an initial document portion of a digital document; and
        apply the triggering change to the initial document portion; and
    a trailing change module implemented at least partially in hardware of the computing device to:
        detect a subsequent document portions includes a transient tag or is untagged based on metadata associated with the subsequent document portion;
        determine, automatically and without user intervention using natural language processing, a trailing change is to be applied to the subsequent document portions based on the triggering change, the determination performed responsive to the detection that the subsequent document portion includes the transient tag or is untagged;

apply the trailing change to the subsequent document portions automatically and without user intervention using natural language processing responsive to the determination to apply the trailing change.

11. The system as described in claim 10, wherein the trailing change module is configured to change a plurality of said subsequent document portions.

12. The system as described in claim 11, further comprising a change ranking module configured to rank the plurality of said subsequent document portions in a ranked order.

13. The system as described in claim 12, wherein the ranked order is based on whether respective trailing changes involve factual accuracy, logical consistency, linguistic correctness, or stylistic continuity.

14. The system as described in claim 10, wherein the triggering change involves receipt of a user input to manually specify the triggering change to the initial document portion.

15. The system as described in claim 10, wherein the triggering change involves detecting a change, automatically and without user intervention, to an external reference corpus outside of the digital document, the external reference corpus identified as having subject matter that corresponds to subject matter of the initial document portion of the digital document.

16. The system as described in claim 10, wherein the subsequent document portion is part of the digital document.

17. The system as described in claim 10, wherein the subsequent document portion is part of another digital document.

18. In a digital medium document update environment, a system comprising:

means for detecting an input specifying a triggering change to an initial document portion of a digital document;

means for applying the triggering change to the initial document portion of the digital document;

means for detecting a subsequent document portion includes a transient tag or is untagged based on metadata associated with the subsequent document portion;

means for determining a trailing change to be made to subsequent document portion based on the triggering change using natural language processing and responsive to the detecting means detecting the subsequent document portion includes the transient tag or is untagged; and means for applying the trailing change to the subsequent document portion automatically and without user intervention responsive to the determining means.

19. The system as described in claim 18, wherein the subsequent document portion is included in another document.

20. The system as described in claim 18, further comprising means for outputting a plurality of said subsequent document portions having the trailing change in a ranked order, the ranked order based on whether the trailing changes involve factual accuracy, logical consistency, linguistic correctness, or stylistic continuity.

* * * * *

UNITED STATES PATENT AND TRADEMARK OFFICE
CERTIFICATE OF CORRECTION

PATENT NO. : 10,846,466 B2
APPLICATION NO. : 15/821468
DATED : November 24, 2020
INVENTOR(S) : Vinay et al.

Page 1 of 1

It is certified that error appears in the above-identified patent and that said Letters Patent is hereby corrected as shown below:

In the Claims

Column 12, Line 63, after "subsequent document", delete "portions", insert -- portion --, therefor.

Column 13, Line 1, after "subsequent document", delete "portions", insert -- portion --, therefor.

Column 13, Line 7, after "subsequent document", delete "portions", insert -- portion --, therefor.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*